United States Patent [19]

Takeuchi

[11] Patent Number: 4,824,358

[45] Date of Patent: Apr. 25, 1989

[54] RESIN MOLDING DIE

[75] Inventor: Hiroshi Takeuchi, Tokyo, Japan

[73] Assignee: Shinkoh Sellbic Co., Ltd., Tokyo, Japan

[21] Appl. No.: 203,998

[22] Filed: Jun. 8, 1988

[30] Foreign Application Priority Data

Jul. 17, 1987 [JP] Japan ................. 62-178654

[51] Int. Cl.$^4$ ............... B29C 39/30; B29C 45/38
[52] U.S. Cl. ................... 425/436 R; 249/67; 249/160; 264/161; 425/289; 425/554; 425/443; 425/444; 425/219
[58] Field of Search ............ 249/66 R, 67, 160, 161; 264/161; 425/436, 441, 443, 444, 289, 554, 556, 438

[56] References Cited

U.S. PATENT DOCUMENTS 2,524,858 10/1950 Thomas ............................ 425/219
3,575,233 4/1971 Mahle ................................ 425/556
3,724,802 4/1973 Veneria ............................. 425/443
3,904,165 9/1975 Den Boer .......................... 425/444
3,989,436 11/1976 McNeely et al. ................. 425/444

FOREIGN PATENT DOCUMENTS 68922 4/1985 Japan .
264217 12/1985 Japan .

Primary Examiner—Willard Hoag
Attorney, Agent, or Firm—Oblon, Fisher, Spivak, McClelland & Maier

[57] ABSTRACT

A rotary block having a gate is rotatably mounted within either one of stationary or movable die plates so that the gate forms a resin passage interconnected to a molding cavity in the stationary die plate in the mold closing state. A gate slug which is inevitably formed on a molded article in injection molding can effectively be cut off by rotating the rotary block so as to intercept the resin passage before a mold opening process.

12 Claims, 5 Drawing Sheets

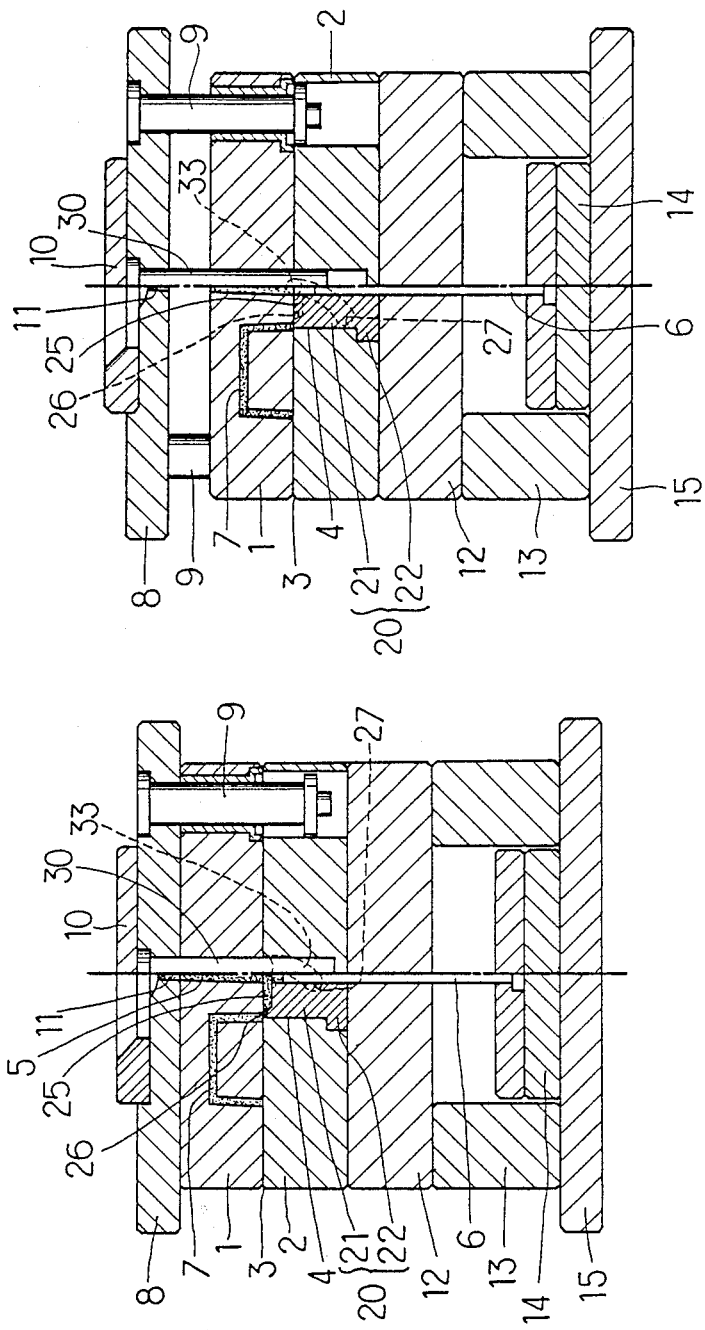

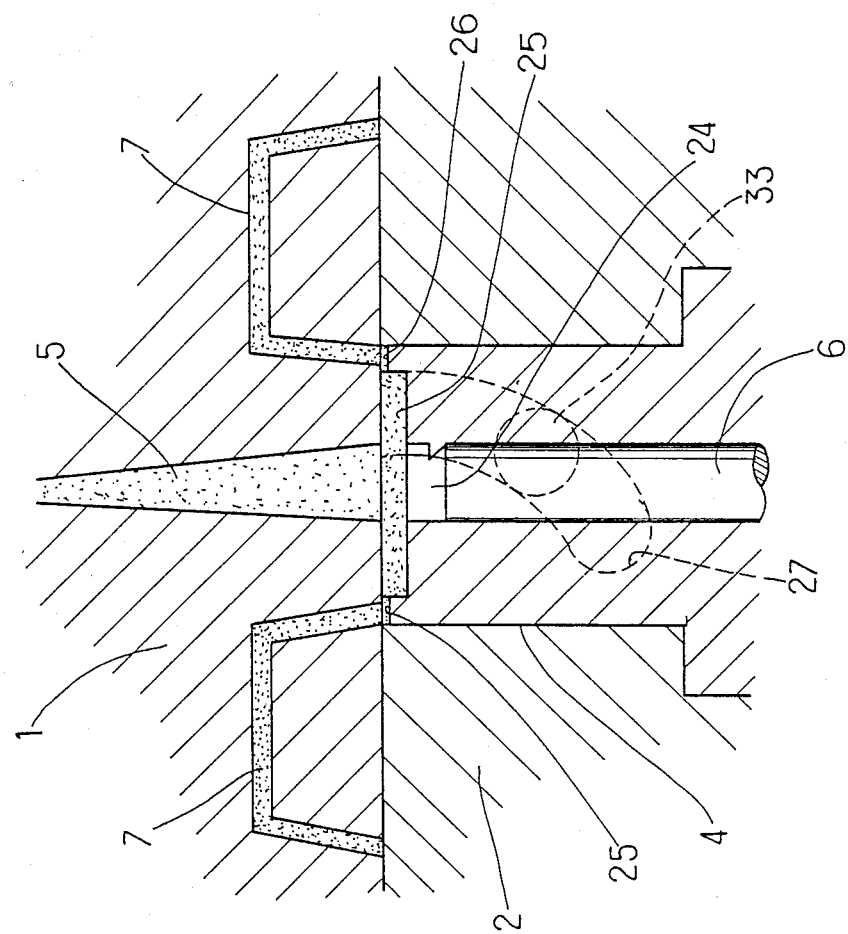
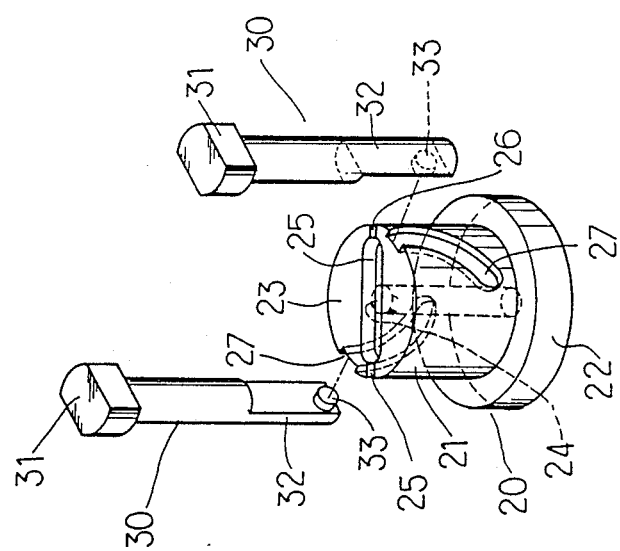

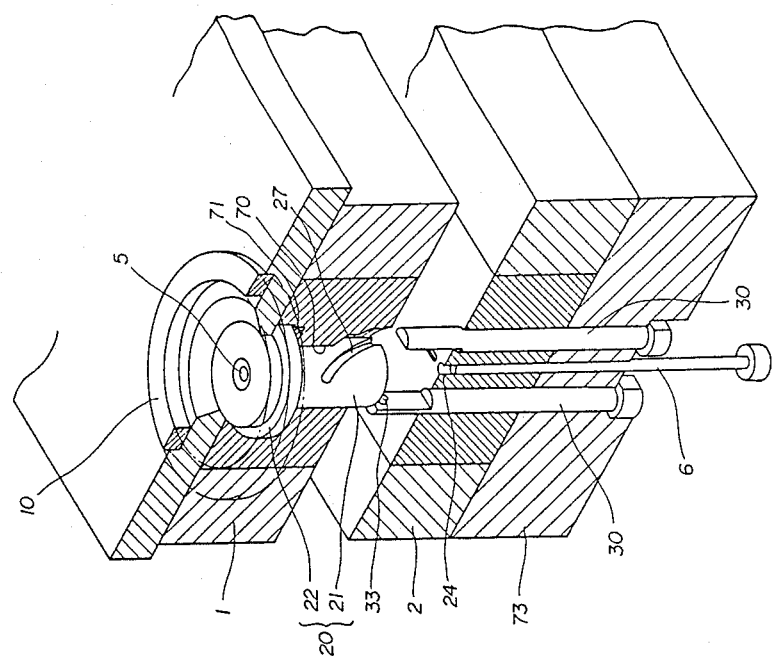
F I G. 9
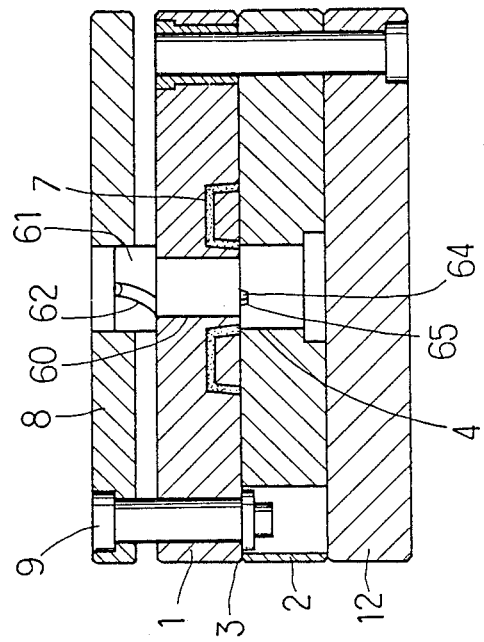
F I G. 8

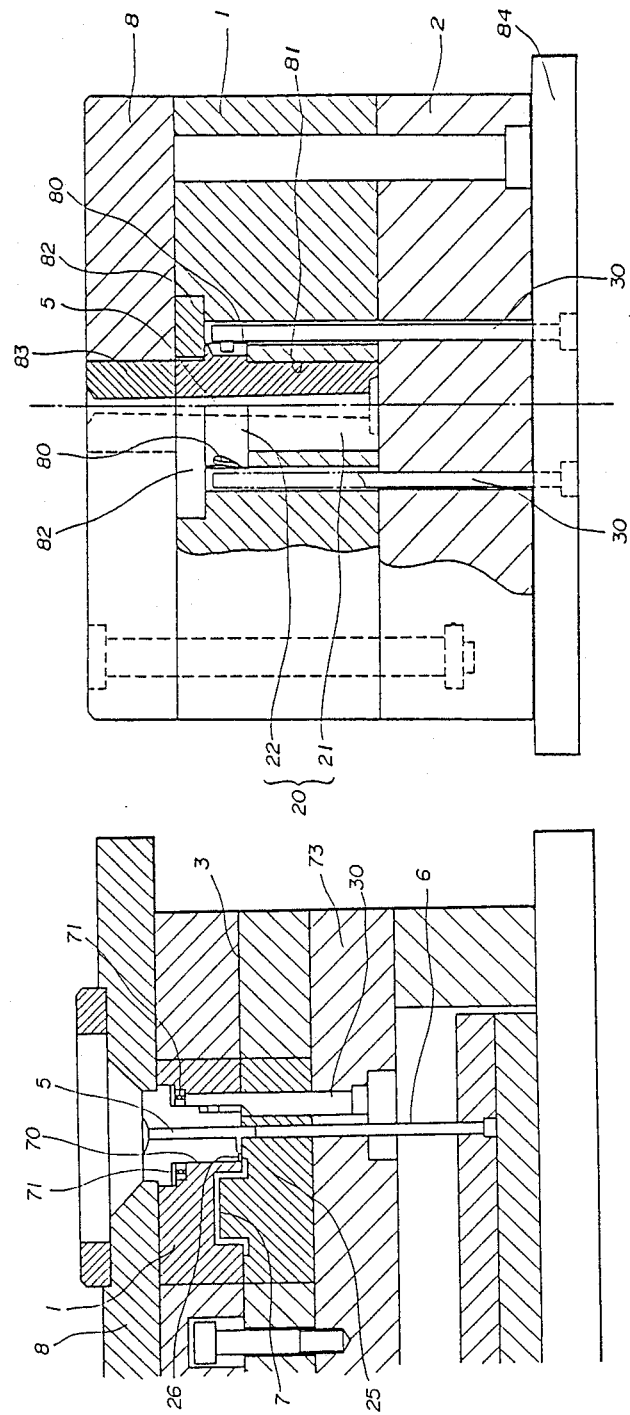

RESIN MOLDING DIE

BACKGROUND OF THE INVENTION

1. Field of the Invention:

This invention relates to a resin molding die having the function of a gate cutter. More particularly, this invention relates to a resin molding die capable of automatically cutting off a gate slug from a molded article before a mold opens.

2. Description of the Prior Art:

A molded article producted by injection molding in which molten resin is injected into a mold cavity through a gate has integrally a gate slug formed inevitably at the gate in the mold. The gate slug formed integrally on the molded article has generally been cut off by use of a hand tool such as a nipper after the molded article is released from the mold upon completion of an injection molding shot. The work of cutting off the gate slug from the molded article requires labor and proves to be troublesome. Furthermore, the gate slug cannot be finely cut off, thereby to deteriorate the quality of the molded product.

Japanese Patent Application Public Disclosure No. SHO 60-264217(A) proposes a method in which a gate slug formed on a molded article is cut off by means of an ejector pin at the time when a mold is open.

Otherwise, a structure in which a cutter which moves transversely along the parting line between molding die halves so as to cut a gate slug off from a molded product has been proposed in Japanese Patent Application Public Disclosure No. SHO 60-68922(A).

The former method for cutting off the gate slug is effected by ejecting the ejector pin to release the molded product from the mold in a mold opening process. However, it is impossible to automatically cut off the gate slug. This is because the molded product which is still retained in one molding die half provided with the ejector pin is not supported by the other molding die half at the time the molding die halves are open, and thus, no means supports the molded product when the ejector pin is ejected to release the molded product from the mold. Therefore, this prior art method has entailed a disadvantage that it can be applied merely to a specific molding die structure.

The latter gate slug-cutting structure necessitates a large-scaled and complicated mechanism for sliding the cutter along the parting face of one molding die half. Since the gate slug-cutting in either technique is carried out after the molding die halves are open, both the conventional slug-cutting techniques cannot be adapted to speeding up of injection molding. That is to say, the work of cutting off the gate slug according to the former slug-cutting method consumes much time because the ejector pin is ejected after a mold opening process is completed. Also, the latter will increase the time required for moving the cutter across the gate position in the parting face of one molding die half after the molding die halves are complately open.

OBJECT AND SUMMARY OF THE INVENTION

The present invention aims to eliminate the aforemention drawbacks of conventional slug-cutting techniques. An object of the invention is to provide a resin molding die structure capable of automatically cutting off a gate slug from a molded product immediately before a mold opening process, thereby to enable molded articles of good quality to be produced at high speed.

To attain the above object according to this invention, there is provided a resin molding die structure comprising a movable die plate, a stationary die plate having a molding cavity, a rotary block rotatably incorporated in the movable die plate or stationary die plate and having a gate intervening between a sprue and the molding cavity so as to form a resin passage, wherein the resin passage is intercepted by rotating the rotary block.

The rotary block has an end face flush with the parting line of a mold constituted by the movable die plate and the stationary die plate. Molten resin supplied via the sprue is injected from the gate into the molding cavity. Before the mold is open, the rotary block is rotated to cut the gate so as to intercept the resin passage extending from the sprue to the molding cavity through the gate, thereby to obtain a molded product having no gate slug. Thus, the gate slug is effectively cut off by rotating the rotary block immediately before the mold opening.

The other objects and features of the invention will now be explained in detail with reference to the accompanying drawings.

BRIEF DESCRIPTION OF THE DRAWINGS

The invention will be better understood from the following description taken in connection with the accompanying drawings in which:

FIG. 1 is a sectional view of one preferred embodiment of the resin molding die according to the invention, showing a side section on the left and a front on the right;

FIG. 2 is a sectional view showing the gate-cut state of the same;

FIG. 3 is a fragmentary perspective view on an enlarged scale of the principal elements of the same;

FIG. 4 is an enlarged sectional side view of the principal elements of the same;

FIG. 8 is a sectional side view in the gate-cut state of FIG. 7;

FIG. 9 is a perspective view of a fifth embodiment of the invention with parts partly broken away;

FIG. 10 is a sectional view of FIG. 9, showing a side section on the left and a front on the right; and FIG. 11 is a side view, partly in cross section, of a sixth embodiment of the invention.

DETAILED DESCRIPTION OF THE PREFERRED EMBODIMENTS

Figure 7:
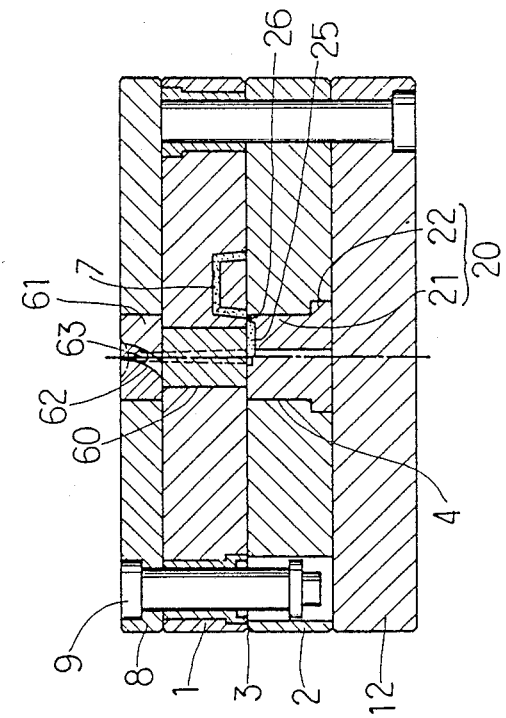
FIG. 7 is a sectional view in the molding state of a fourth embodiment of the invention, showing a side section on the left and a front section on the right.

Referring to the attached drawings, in FIGS. 1 through 4, there is shown one preferred embodiment of the resin molding die structure according to the present invention.

In the drawings, reference numeral 1 denotes a stationary die plate, 2 a movable die plate, and 3 a parting line defined between the aforementioned die plates 1 and 2. The stationary die plate 1 and the movable die plate 2 constitute a mold. The movable die plate 2 is incorporates a rotary block 20.

The rotary block 20 comprises a cylindrical portion 21 of a relatively small diameter and a flange portion 22 of a relatively large diameter and fitted rotatably in a mounting hole 4 bored in the movable die plate 2. The leading end or upper surface 23 of the rotary block 20 is flush with the upper surface of the movable die plate 2, namely, the parting line 3. In this embodiment, the rotary block 20 is provided along its axis with a sprue locking hole 24 to be interconnected with a sprue 5 formed in the stationary die plate 1. In the sprue locking hole 24 in the rotary block 20, there is slidably inserted a sprue puller pin 6.

The rotary block 20 is provided in its leading end or upper surface 23 with a runner 25 and at least one gate groove 26 extending outwardly from the runner 25. Through a narrow gate formed by the gate groove 26 in the mold closing state, the sprue 5 and the runner 25 are in communication with the molding cavity 7 formed in the stationary die plate 1. The rotary block 20 has at least one spiral groove 27 formed in the outer peripheral surface of the cylindrical portion 21.

By 30 is denoted an operating member which is engaged with the spiral groove 27 formed in the rotary block 20 and disposed so as to slidably move in the axial direction, thereby to permit the rotary block 20 to rotate. To be more specific, the operating member 30 comprises an expanded portion 31 formed at the basal end thereof which is clamped by a stationary side fixing plate 8 and an arm portion 32 having a projection 33 at the leading end thereof, which is slidably fitted into the spiral groove 27. Thus, by moving the operating member 30 in the axial direction, the projection 33 works on the spiral groove 27 to thereby rotate the rotary block 20. In order to operate the operating member 30, the stationary side fixing plate 8 is mounted so as to independently move relative to the stationary die plate 1 and supported and restricted in movement within a fixed range by rods 9. Though, in the illustrated embodiment, two molding cavities 7, two gates 26, a pair of spiral grooves 27 and a pair of operating members 30 are adopted, the number and shape of these elements are not specifically limited.

Denoted by 10 is a locating ring, 11 a sprue bush, 12 a movable side supporting member, 13 a spacer block, 14 an ejector plate, and 14 a movable side fixing plate.

In the mold closing state as shown in FIG. 1, the projections 33 disposed on the operating members 30 are in engagement with the spiral grooves 27 formed in the outer peripheral surface of the rotary block 20 assuming its initial state. At this time, the sprue 5, sprue locking hole 24, runner 25 and gate 26 are interconnected with one another to form the resin passage to the molding cavity 7. Thus, molten resin can be injected into the cavity 7 through the resin passage so as to produce a molded article of a desired shape.

Subsequently, at the time of a gate seal process or upon completion of a dwelling process, the stationary side fixing plate 8 or a stripper plate (not shown) is moved away from the stationary die plate 1 as the mold remains in the closed state as shown in FIG. 2. By separating the stationary side fixing plate 8 from the stationary die plate 1 in the mold closing state, the operating members 30 connected fixedly to the fixing plate 8 are pulled upward to cause the projections 33 formed on the leading end portion of the operating members 30 to work on the spiral grooves 27, thereby to forcibly rotate the rotary block 20. Consequently, the runner 25 and gates 26 which are formed in the end face of the rotary block 20 are changed in direction to thereby intercept the resin passage extending from the sprue 5 to the molding cavity 7. That is to say, the gate formed in the rotary block 20 is deviated from the resin passage. As a result, a gate slug which is inevitably formed in injection molding is cut off. Since the sprue puller pin 6 is located at the axial center of the mold, the rotary block 20 rotates about the sprue puller pin 6.

Thereafter, when the mold opens, a molded article from which the gate slug has been cut off is released from the molding cavity 7. The remnants such as the gate slug left in the runner 25, the gate 26 and sprue locking hole 15 are removed by projecting the sprue puller pin 6.

Upon completion of one injection molding shot, the movable die plate 2 is moved toward the statinary die plate 1 to close the mold for the subsequent molding shot, consequently to bring the rotary block 20 close to the stationary die plate 1 and into deeper engagement with the operating members 30. As a result, the rotary block 20 is reversely rotated to its initial posture by the operating members 30 having their projections 33 engaged with the spiral grooves 27 of the rotary block 20.

As is apparent from the above, according to this invention, a gate slug inevitably produced in the gate of the mold can be effectively and readily cut off from a molded product, at the beginning of a mold opening process before the mold is not yet open, without prolonging the time required for one molding shot, because the rotary block 20 is driven to slightly rotate by the operating members 30 mounted on the stationary die plate side.

Figure 5:
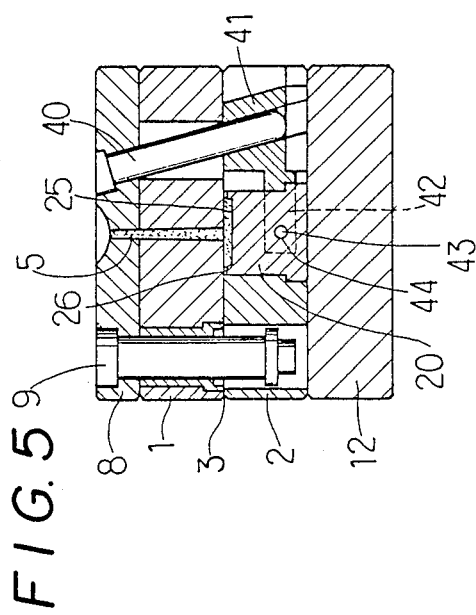
FIG. 5 is a sectional front view of a second embodiment of the invention.

The structure including the operating member for exerting rotational force onto the rotary block 20 may be modified as illustrated in FIG. 5. In this figure showing a second embodiment of the invention, the elements indicated by like reference numerals with respect to those of the first embodiment noted above have analogous structures and functions to those of the first embodiment and will not be described in detail again.

In this embodiments, an operating member 42 which projects from a slide core 41 for supporting an inclined pin 40 has a projection 43 engaged with a slot 44 formed in the cylindrical portion 21 of the rotary block 20.

When the mold is in the mold closing state, the inclined pin 40 is deeply inserted into the slide core 41 and the slide core 41 is positioned close to the rotary block 20. At this time, the rotary block 20 assumes its normal state in which the gate 26 formed in the end surface of the rotary block 20 interconnects the runner 25 and the molding cavity so as to form a resin passage. Upon completion of injection of molten resin into the molding cavity, the fixing plate 8 moves upward and is separated from the stationary die plate 1, thereby to move the slide core 41 away from the rotary block 20 by the action of the inclined pin 40. Consequently, the rotary block 20 is rotated counterclockwise in the figure to thereby cut off the gate. In order to retain the rotary block 20 at the center of the mold, springs (not shown) may be disposed on the opposite outer side of the cylindrical portion 21 of the rotary block 20 so as to urge laterally the rotary block.

Figure 6:
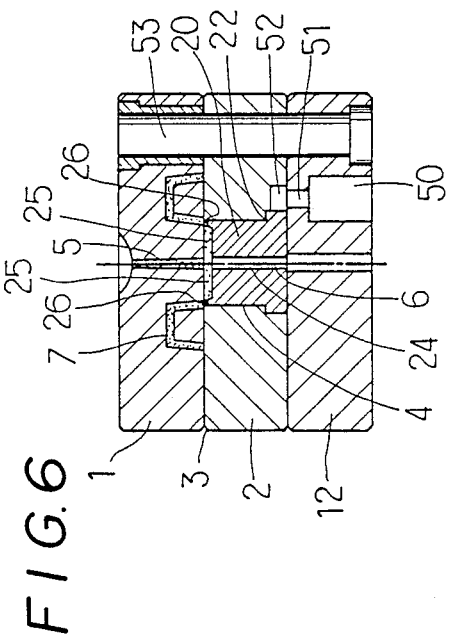
FIG. 6 is a sectional side view of a third embodiment of the invention.

As an operating member for exerting rotational force onto the rotary block, there may instead be used a motor 50 as illustrated in FIG. 6. The motor 50 is built in the movable side supporting plate 12 and provided at the leading end of a drive shaft 51 with a gear 52 which is meshed with a gear formed on the outer peripheral surface of the flange portion 22 of the rotary block 20. According to this mechanism, gate cutting can be effected at any time by actuating the motor 50 to rotate the rotary block 20. In the drawing, reference numeral 53 denotes a guide pin.

In a fourth embodiment shown in FIGS. 7 and 8, a sprue bush 60 is formed in a cylindrical shape and mounted rotatably within the stationary die plate 1. The sprue bush 60 has an enlarged portion 61 contained in a bore formed in the stationary side fixing plate 8. In one part of the outer periphery of the enlarged portion 61, there is formed a spiral groove 62. On the inner surface of the bore in the fixing plate 8, there is formed a projection 63 which is in engagement with the spiral groove 62 in the enlarged portion 61 of the sprue bush 60. The sprue bush 60 and the rotary block 20 are engaged with each other by means of an engaging concave member 64 formed on the sprue bush 60 and an engaging convex member 65 formed in the rotary block 20.

With the structure noted above, the sprue bush 60 is driven to rotate by moving the fixing plate 8 away from the stationary die plate 1 so as to exert lateral torque onto the spiral groove 62 by the projection 63 moving vertically, thereby to rotate the sprue bush 60. The rotational motion of the sprue bush 60 is transmitted to the rotary block 20 through the engaged concave and convex members 64 and 65. Thus, the rotary block 20 is rotated to cut off the gate.

As explained in the foregoing, the rotary block 20 may be linked to various rotational driving means and the structure for cutting off a gate according to this invention can be applied to conventional molds of various types.

Though, in the foregoing embodiments, the rotary block 20 is incorporated in the movable die plate 2, it may be built in the stationary die plate 1 as shown in FIGS. 9 and 10. To be specific, the stationary die plate 1 is bored to form a mounting hole 70 for the rotary block 20. In order to rotate the rotary block 20 smoothly, the rotary block 20 may be supported rotatably by a bearing 71 mounted within a mounting hole 70. In this embodiment, the stationary side fixing plate 8 serves merely to retain the flange portion 22 of the rotary block 20, and therefore, it may be fixedly connected to the stationary die plate 1. The sprue 5 can be formed in the rotary block 20.

On the other hand, the operating members 30 in this embodiment are slidably mounted in the movable die plate 2 and fixed at their lower end portion onto the movable side fixing plate 73. The linkage of the rotary block 20 and the operating members 30 can be fulfilled by bringing the projections 33 formed on the operating member 30 into engagement with the spiral groove 27 formed in the outer peripheral surface of the rotary member 20. Therefore, by moving the movable plate 73 relative to the movable die plate 2 in the mold closing state, the rotary block 20 can be driven to rotate, consequently to cut off a gate slug from a molded product.

As is plain from the foregoing, the rotary block 20 serving to cut off a gate slug may be disposed in either of the stationary and movable die plates, thereby to enhance the degree of freedom in structural design.

The spiral grooves 27 in the embodiment noted above are formed in the outer peripheral surface of the cylindrical portion 21 of the rotary block 20. The spiral groove may otherwise be formed in the flange portion 22 of the rotary block 20. Namely, the flange portion 22 of the rotary block is provided in its outer peripheral surface with spiral grooves 80 as illustrated in FIG. 11. Thus, the rotational torque brought about on the rotary block 20 is increased to reliably rotate the rotary block. Besides, restrictions on the shape and size of the molding cavity can be somewhat lightened in designing and manufacturing. The rotary block 20 is retained by a ring 82 to be prevented from coming out. A sprue bush 83 is incorporated into the fixing plate 8 and comes in contact with the rotary block 20 so that the sprue 5 pierces through the sprue bush 83 and the rotary block 20. The operating members 30 are connected to the stationary side fixing plate 84. These and other elements denoted by the same reference numerals as those in the foregoing embodiments are equivalent in function to those in the foregoing embodiments.

As has been described above, the resin molding die according to this invention makes it possible to automatically and finely cut off a gate slug inevitably formed in injection molding immediately before a mold opening process, thereby to effectively produce molded articles of good quality at high speed.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A resin molding die comprising a movable die plate, a stationary die plate having a molding cavity, a rotary block mounted rotatably within said movable die plate or stationary die plate and provided in its one end face with a gate defining a resin passage communicating with said molding cavity, and at least one operating member adapted to rotate said rotary block so as to deviate the gate of said rotary block from the resin passage, whereby a gate slug formed in injection molding is cut off from a molded product before a mold is open.

2. A resin molding die according to claim 1 wherein said rotary block is provided in said one end face thereof with a runner communicating with said gate.

3. A resin molding die according to claim 1 wherein said rotary block is rotatably mounted within said movable die plate.

4. A resin molding die according to claim 1 further comprising a stationary side fixing plate disposed so as to independently move relative to said stationary die plate, wherein said at least one operating member is fixed onto said stationary die plate so as to rotate said rotary block by moving said stationary side fixing plate relative to said stationary die plate.

5. A resin molding die according to claim 4 wherein said rotary block is provided in its outer peripheral surface with at least one spiral groove and said operating member is provided with at least one projection which comes in engagement with said spiral groove.

6. A resin molding die according to claim 4 wherein said stationary die plate is provided with a sprue and said movable die plate is provided with a sprue puller pin.

7. A resin molding die according to claim 1 wherein said rotary block is rotatably incorporated within said stationary die plate.

8. A resin molding die according to claim 7 further comprising a movable side fixing plate disposed so as to independently move relative to said movable die plate, wherein said at least one operating member is fixed onto said movable die plate so as to rotate said rotary block by moving said movable side fixing plate relative to said movable die plate.

9. A resin molding die according to claim 7 wherein said rotary block is provided in its outer peripheral surface with at least one spiral groove and said operating member is provided with at least one projection which comes in engagement with said spiral groove.

10. A resin molding die according to claim 7 wherein said rotary block is provided with a sprue and said stationary die plate is provided with a sprue puller pin.

11. A resin molding die according to claim 9 wherein said rotary block comprises a cylindrical portion of a relatively small diameter and a flange portion of a relatively large diameter and said spiral groove is formed in said cylindrical portion.

12. A resin molding die according to claim 9 wherein said rotary block comprises a cylindrical portion of a relatively small diameter and a flange portion of a relatively large diameter and said spiral groove is formed in said flange portion.

* * * * *